United States Patent [19] [11] 3,832,683

Nadler et al. [45] Aug. 27, 1974

[54] CHARACTER-IDENTIFICATION DEVICE

[75] Inventors: Morton Nadler; Christian Masson, both of Paris, France

[73] Assignee: Societe Honeywell Bull (Societe Anonyme), Paris, France

[22] Filed: June 20, 1973

[21] Appl. No.: 371,902

[30] Foreign Application Priority Data

June 30, 1972 France .......................... 72.23669

[52] U.S. Cl. ............ 340/146.3 MA, 340/146.3 AC, 340/146.3 AQ

[51] Int. Cl. ........................................ G06k 9/12

[58] Field of Search ........... 340/146.3 AQ, 146.3 Q, 340/146.3 MA, 146.3 R, 146.3 AG

[56] References Cited

UNITED STATES PATENTS

| | | | |
|---|---|---|---|
| 3,588,823 | 6/1971 | Chow et al. | 340/146.3 S |
| 3,688,267 | 8/1972 | Iijima et al. | 340/146.3 MA |
| 3,790,955 | 2/1974 | Klemt | 340/146.3 MA |

*Primary Examiner*—Raulfe B. Zache
*Assistant Examiner*—Leo H. Boudreau
*Attorney, Agent, or Firm*—Fred Jacob

[57] ABSTRACT

A character identification device which enables the identification of defective printed characters is designed to be part of a recognition system for printed characters.

This device includes a number of identification circuits equal to the number of character patterns which are validated by a validating and global centering circuit, and the two outputs of which are connected to a decision circuit, for a first level of decision in favor of one character pattern given by a global analysis of the character to be recognized from a set of discrimination circuits included in each identification circuit, and for a second decision level by a local analysis of the character to be recognized following the global analysis and carried out by the said discrimination circuits.

14 Claims, 13 Drawing Figures

CHARACTER-IDENTIFICATION DEVICE

BACKGROUND OF THE INVENTION

The object of the present invention is a character-identification device intended to be integrated into a recognition system for printed characters.

The known recognition systems consist of a device for point-by-point scanning of the surface on which characters to be recognized are printed, for example by means of reading media, such as those described in a co-pending application Ser. No. 289,392, filed Sept. 15, 1972, entitled: "Read Head for an Optical Character-Recognition System"which is assigned to assignee of this application. This scanning device is followed by a device for analysis of the elements in which the scanned surface is divided, which makes it possible to send the resulting coded information to a shift register in matrix form, called: a character store. This memory is conceived in such a way that each stored bit of information appears successively in all possible positions, shifted vertically and horizontally, before being rejected. This shift is performed in synchronization with the analysis and permits one to enter, for a given character, successively in the memory different elements of this character and the complete character.

By known appropriate means, the instant at which the complete character and certain of its elements are lodged in the memory may be determined. These means enable a logical identification device, connected with different storing-position systems of the memory, to decide the identity of a character to be recognized, and of a character pattern of a given set.

It frequently happens that the printed surface exhibits defects, such as smudges, print omissions, or variations of tint which make the recognition of a character difficult. Means have already been suggested for a better definition of the zones, though of poor tint, of a character and for effecting a corrected image in the character memory. These means are described in a co-pending application, Ser. No. 311,073, Dec. 1, 1972, entitled: "Process and Device for Elementary Analysis of a Printed Surface", which is assigned to the assignee of this application. They eliminate local printing defects of a character and thus produce a reduced rejection rate. Still, if a character is completely deformed due to the partial or total absence of complete elements which serve to make it up, ambiguities may occur which the identification device is not capable of removing. Identification devices were developed on the basis of statistical analyses which make it possible to keep in evidence the most frequent defects in such a manner that a character can be identified in spite of the existence of the defects.

Such a device comprises a certain number of logical circuits, called masks, each connected with a given group of positions of the character memory to detect the presence of certain information combinations in the memory and to emit a signal in the case of detection. It is characterized by a system of counters, each connected with a different mask circuit for counting the detection signals by these masks and by decision elements for the comparison of the contents of the counters and for identification of a character by the counter containing the highest count. The decision is only made under the condition that said count be at least equal to a predetermined minimum count and that in the other counters, no count exists whose difference from the highest count be below a predetermined minimum difference. Though this device provides an improved character identification with additional flexibility levels by making use of different, selectively controllable threshholds of judgement, identification errors may occur. In fact, a character may be considered a group of printed elements covering determined adjoining zones, each element consisting of a set of printing points which are registered in the different positions of the character memory. A character imperfectly printed includes then, at least one element, not printed or partially printed on the corresponding given zone, or printed on a wider extended zone than the given zone, when there are smudges. The same character may comprise, for example, given zones, not printed by mistake, and too widely extended printed zones. In this case, an identification device, such as that mentioned above, working with integration logic, risks the elimination of a character exhibiting numerous missing print points, but whose present points are characteristic without ambiguity, with another character. It could also happen that two counts are higher than the others without presenting a difference between them so as not to create an ambiguity, although the character to be recognized has sufficient specific elements for its identification. A higher count than the others could also entail a mistake in interpretation, if it is caused by ridges.

One of the objects of the present invention is the very precise identification of a character exhibiting a printing defect, which are the cause of ambiguities not eliminated by the known identification devices.

SUMMARY OF THE INVENTION

According to the invention, the character-identification device for N character pattern, comprising N identification circuits that operate with masks, a circuit for validation and for complete centering, and a decision circuit, is characterized in that:

a. the identification device receives from a character memory 10 an image *x* of the character to be recognized;

b. each identification circuit, being associated with a character pattern is available for the identification of the image *x* with that character;

c. one character n is one of the N model characters and one character *i* is any of the (N–1) characters other than *n;* d. the character n is statistically characterized by the elements E1 (*n*/*i*) which are specific for it in relation to the character *i* and which differentiate it completely from the character *i;* e. the character *i* being characterized statistically by elements in common with character *n*, by elements E1 (*i*/*n*) which are specific of it in relation to character *n* and specific elements E2 (*i*/*n*) depend each on a specific element and on a common element which differentiates it locally from the character *n;* and an identification circuit n includes a mask circuit 21 and at the most (N–1) discrimination circuits of which one is a discrimination circuit *i.*

These circuits are defined in the following manner:

the mask circuit 21 includes a first mask circuit M1, validated by the validation circuit, permitting a first level of decision, and the validation of the second mask M2 for a second level of decision;

the discrimination circuit $i$ includes a first operator P1 $(i)_n$, associated, on the one hand, with the elements E1 $(n/i)$ and, on the other hand, with the elements E1 $(i/n)$, a second operator P2 $(i)_n$, associated with the elements E2 $(i/n)$, and a logic gate L whose two inputs are linked with a first output of the operator P1 $(i)_n$ and with the output of the operator P2 $(i)_n$, respectively, the second output of the operator P1 $(i)_n$, being tied to the mask circuit, as well as the output of the gate L, the operator P1 $(i)_n$ serving to evaluate if the elements of the image $x$ to be attributed, partly, to the elements E1 $(n/i)$ and, partially, to the elements E1 $(i/n)$ allow a choice by comparison between the characters $n$ and $i$, or to indicate an ambiguity, and in the case in which the operator P1 $(i)$ does not choose the character $i$, the operator P2 $(l)_n$ serves to indicate if the elements E2 $(i/n)$ are not elements of the image $x$ so that a decision, at least on one level, may be made in certain fashion in favor of the character $n$, in relation to the character $i$;

all the discrimination circuits, conceived in a similar manner to the discrimination circuit $i$, are connected in parallel to the mask circuit to contribute to a decision, at least on one level, by the identification circuit $n$;

all the identification circuits, conceived in a similar manner to the discrimination circuit $n$, are connected by their mask circuits with a system of registers contained in the decision circuit so that each decision taken by an identification circuit being stored in one of said registers, the periodical consultation of these registers permits the decision circuit, controlled by the validation circuit, to indicate the recognized character.

BRIEF DESCRIPTION OF THE DRAWING

Other characteristics and advantages of the invention will evolve from the following description, presented for exemplary, non-limiting purposes and with reference to the attached figures wherein.

DESCRIPTION OF THE PREFERRED EMBODIMENT

Figure 1:
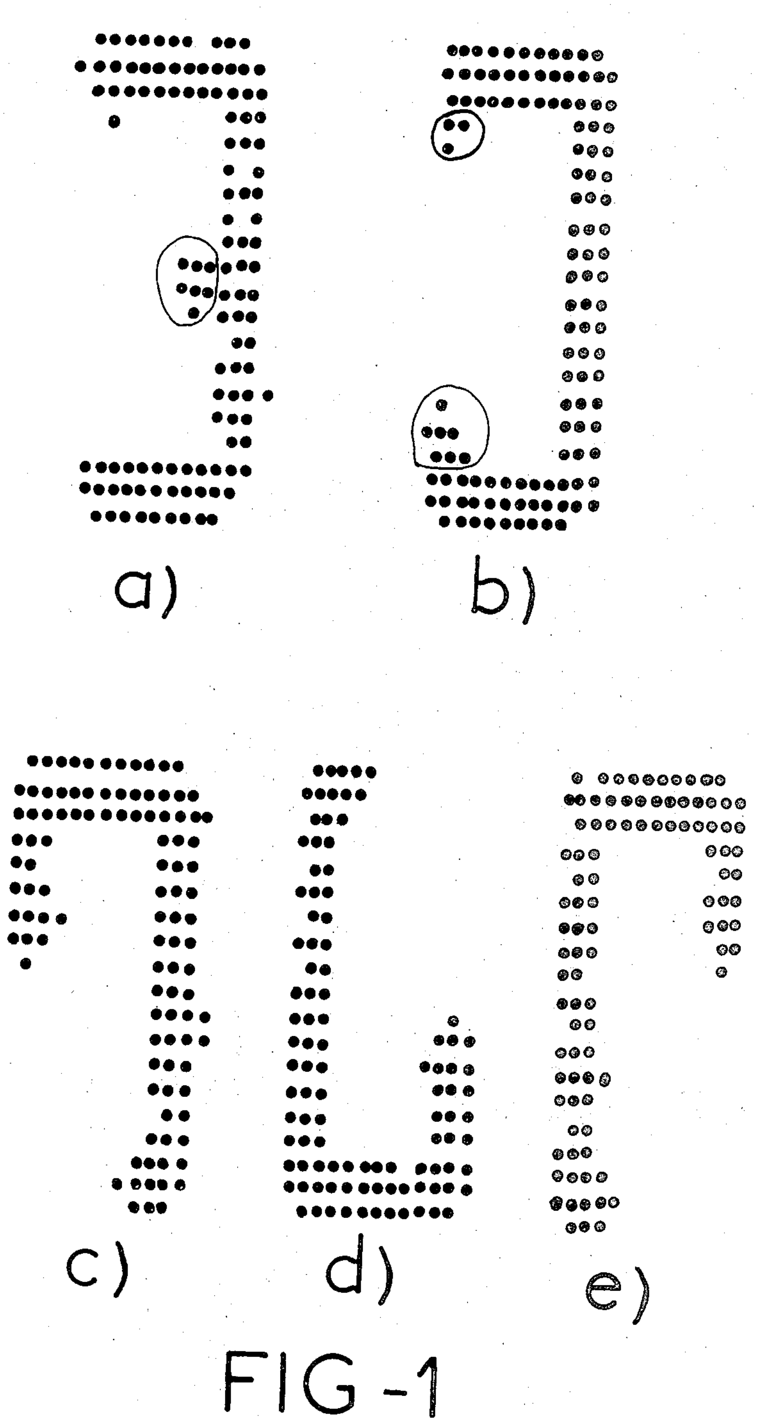
FIG. 1 is a representation of several contents of the character memory with which the identification device is connected, according to the invention.

The following description applies to printed characters of the type OCRA, but is not limited to this type of character. FIG. 1 represents the images of different deformed characters, such as are recorded in the memory. One will particularly notice that the characters of FIGS. 1$a$ and 1$b$ each include three bars which are common elements of the ꓱ and □. The element specific for character ꓱ in relation to the character □ is a central horizontal bar, while the element specific to the character □ in relation to the character ꓱ is a vertical left bar. Thus, the position of the seven points in the center of the character of FIG. 1$a$ denotes a beginning of a bar and thus make it possible to identify the character ꓱ. In the same way, the seven points in the lower part and the three in the upper left part of the character of FIG. 1$b$, specific elements representing two beginnings of a bar, make it possible to identify with the character □.

The character shown in FIG. 1$c$ comprises two bars which are elements common to the characters: ꓱ, ꟼ, □, and a section of a vertical bar which is an element of the character ꟼ, but which may also be considered as part of an element of the character □. In this case there is an apparent identification ambiguity between the characters ꟼ and □. The same applies to the character represented in FIG. 1$d$ where an ambiguity of the identification exists between the characters ь and □. The character exhibited in FIG. 1$e$, by contrast, displays no ambiguity for it includes no bar or section of a bar that could belong to another character than the character □. One will find then, that certain important changes of the outline of the characters do not cause any risk of confusion. On the contrary, other alterations produce an ambiguity which cannot be eliminated except by utilizing the highly specific characteristics of the outline, which are for this reason of utmost importance.

It is in this manner that the identification device according to the invention has been conceived by bearing in mind the statistically chosen elements so that no character is rejected, even when greatly changed, to the extent to which it remains in its outline characteristics which do not render it ambiguous. In view of the haphazard aspect of the outlines of the characters to be recognized, the statistically representative elements which are determined according to a procedure and criteria depending on the special problem to be solved are not described here. Yet, the examples offered hereinafter define the essential characteristics of the device according to the invention, and its possibilities.

The model characters number N and are designated by the figures from 1 to N including particularly the characters marked *n*, *i* and *j*. The identification device illustrated in FIG. 2 includes N identification circuits, each associated with one of the N characters, respectively, whose circuits 1, 2, *n*, N, in parallel between a character memory 10 and two register systems 11 and 12 enclosed in a decision circuit 13, a validation circuit and of complete centering 14, whose input is connected with a group of positions of the character memory 10, with an output 15, linked in parallel with N identification circuits and an output 16 tied to the decision circuit 13. The circuit 14, designed by known means, assures the functions of segmentation, of complete centering and of the validation. The segmentation consists of the generation of an end of character signal, transmitted from the output 16 to the decision circuit 13, which initiates the working of the contents of the registers in the output of each identification circuit, then their reduction to zero. The complete centering corresponds with the system of position for which the image present in the character memory 10 may be considered as correctly centered for each character. The validation consists in defining the positions for which the content of the character memory 10 is taken into consideration by the group of N identification circuits which receive a signal from the output 15 of the validation circuit 14.

Figure 2:
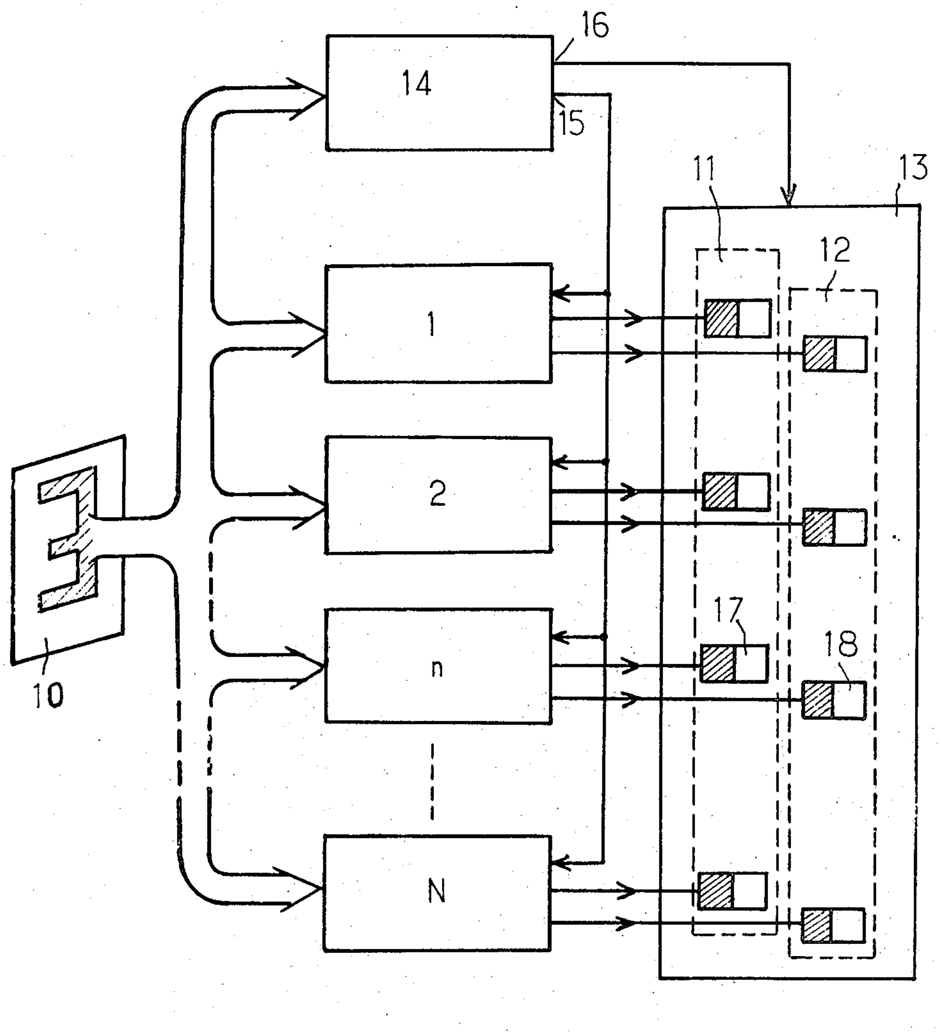
FIG. 2 is a general diagram of the identification device according to the invention.

The two decisions made on two levels by the identification circuit *n* of FIG. 2 are stored in the register 17 and 18 of the systems 11 and 12, respectively. Thus, each decision made on a level by one of the identification circuits is stored in a register. By consultation of the systems of registers 11 and 12, when a signal is emitted by the output 16 of circuit 14, the decision circuit 13 makes it possible to recognize a character identified by a single identification circuit, or to reject it when it is identified by several identification circuits, or when it is not identified by any.

Figure 3:
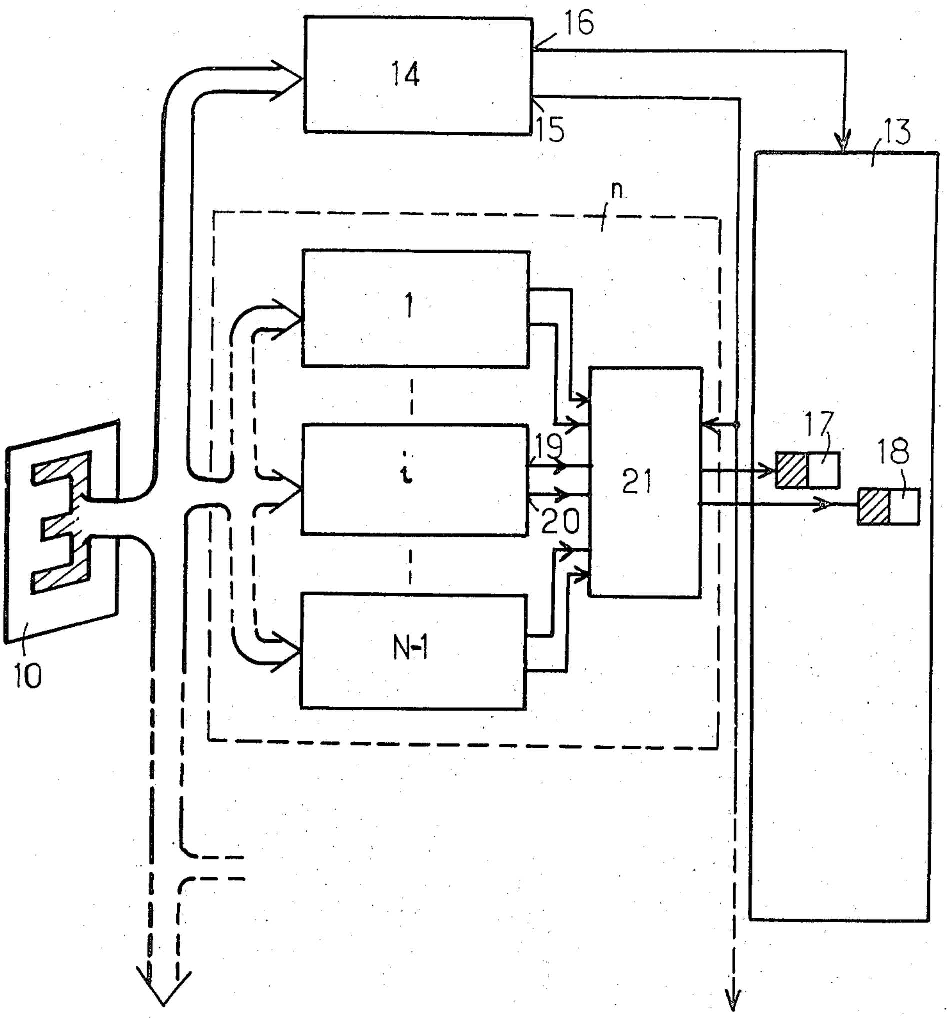
FIG. 3 is a general diagram of an identification circuit being a part of the identification device according to the invention.

The identification circuit *n* of FIG. 2 is also shown in FIG. 3 with its connections to the character memory 10, to the output 15 of the validation circuit 14 and to the registers 17 and 18 of the decision circuit 13. This identification circuit includes at the most (N–1) discrimination circuits, such as the circuits 1, *i* and (N–1) of FIG. 3. The responses which these discrimination circuits give to the information received from the character memory 10 are transmitted by two outputs of each of them, such as the outputs 19 and 20 of the discrimination circuit *i*, to a mask circuit 21. The two outputs of this mask circuit are linked to the registers 17 and 18, respectively. Thus, the two decisions made by the identification circuit n are the result of responses given by all discrimination circuits, such as the circuits 1, *i* and (N–1).

Figure 4:
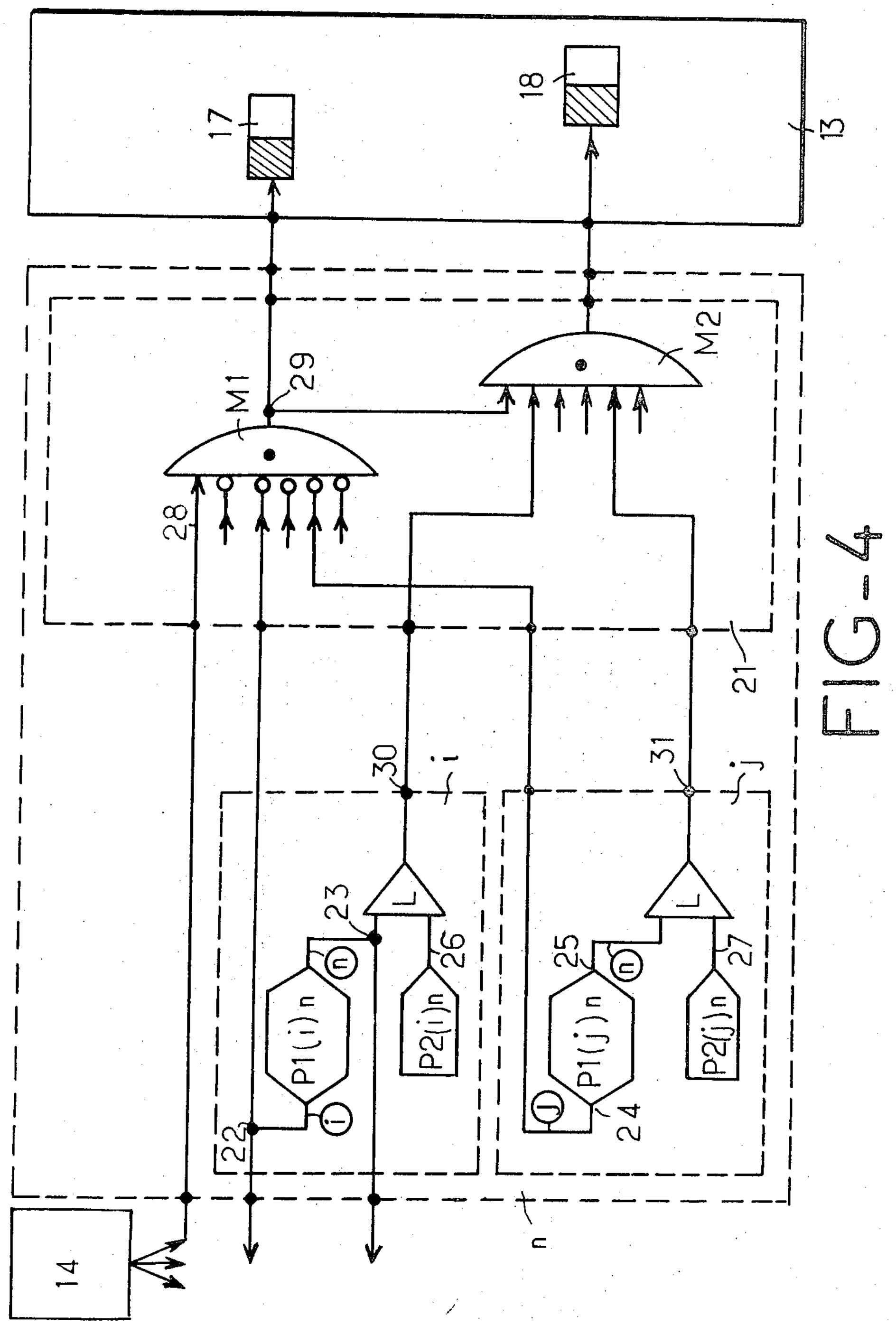
FIG. 4 is a partial diagram of a first example of embodiment of the identification circuit with two levels of the device of the invention.
Figure 5:
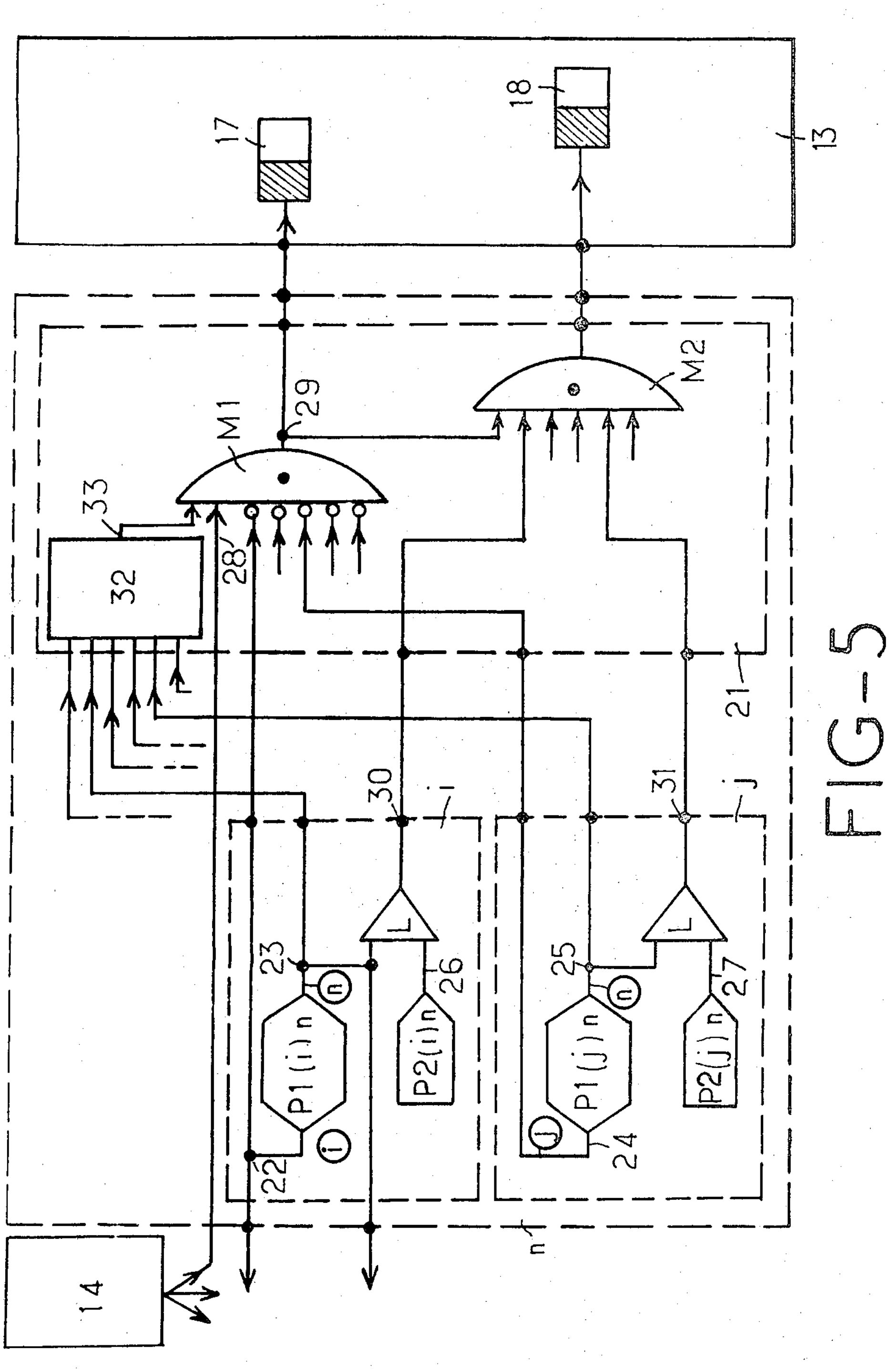
FIG. 5 is a partial diagram of a second example of embodiment of an identification circuit with two levels of the device according to the invention.
Figure 6:
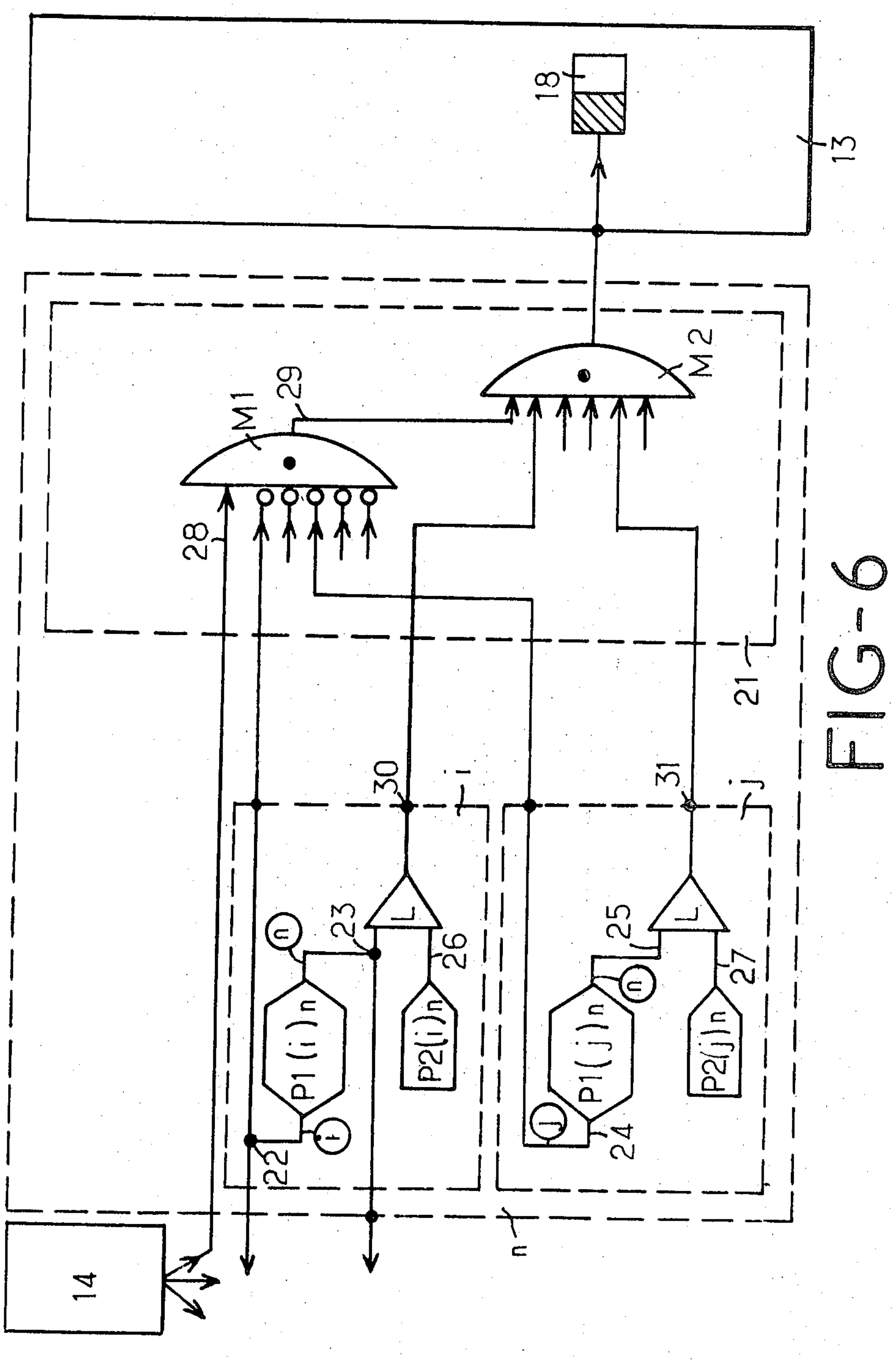
FIG. 6 is a partial diagram of a design of an identification circuit with one level of the device of the invention.

Since the discrimination circuits contained in each identification circuit, as for example in the identification circuit *n* of FIG. 3, are similar, only two discrimination circuits *i* and *j* are represented in FIGS. 4, 5 and 6. FIG. 4 is a first example of embodiment of the identification circuit *n* with two levels of decision connected with two registers 17 and 18 of the decision circuit 13 of FIGS. 2 and 3. Each of the discrimination circuits *i* and *j* is connected with a given system of positions of the character memory 10 (the corresponding connections are not shown in FIGS. 4, 5 and 6 so as not to overcrowd them) and two outputs of each are linked to the mask circuit 21. The discrimination circuit *i* includes two operators P1 $(i)_n$ and P2 $(i)_n$ and a gate L. The discrimination circuit *j* includes two operators P1 $(j)_n$ and P2 $(j)_n$, and a gate L. The mask circuit 13 includes two masks M1 and M2 which are the AND gates whose outputs are linked to the registers 17 and 18, respectively. The mask M1 is validated by the validation circuit 14, while the mask M2 is validated by the mask M1. The operators P1 $(i)_n$, P2 $(i)_n$, P1 $(j)_n$, and P2 $(j)_n$ are designed initiated from the following elements: E1 $(n/i)$, E1 $(i/n)$, E2 $(i/n)$, E1 $(n/j)$, E1 $(j/n)$, E2 $(j/n)$. The elements E1 $(n/j)$ are the specific elements of the character *n* in relation to the character *j*. The elements E1 $(j/n)$ and E2 $(j/n)$ are the proper and specific elements *j* in relation to the character *n*. The connections of the discrimination circuits *i* and *j* with the character memory 10 are performed by the operators P1 $(i)_n$, P2 $(i)_n$, P1 $(j)_n$, P2 $(j)_n$. The presence of a signal at the output 22 of the operator P1 $(i)_n$ indicates that the elements of the analyzed image *x*, to be attributed to the elements E1 $(i/n)$, overbalance those, to be attributed to the elements E1 $(n/i)$, i.e., decide for the character *i*. The presence of a signal at the output 23 of the operator P1 $(i)_n$ indicates a decision in favor of character *n*. If no signal appears at the outputs 22 and 23, it means that the operator P1 $(i)_n$ is neutral, i.e., that there is an ambiguity. In the same manner, the operator P1 $(j)_n$ indicates at its output 24 an option in favor of the character *j* and at its output 25 an option in favor of the character *n*. The absence of a signal at the outputs 24 and 25 indicates an ambiguity, not removed by the operator P1 $(j)_n$. The presence of a signal at the output 26 of the operator P2 $(i)_n$ indicates that elements E2 $(i/n)$ are not present in the analyzed image *x*. In the same way, the presence of a signal at the output 27 of the operator P2 $(j)_n$ indicates that the elements E2 $(j/n)$ are not present in the image *x*. All inputs of the mask M1, other than the input of validation 28, reverse the signals originating in the various discrimination circuits, in particular the *i* and *j* circuits, from the outputs 22 and 23 of their operators P1 $(i)_n$ and P1 $(j)_n$. Thus, when no discrimination circuit sends a signal to the mask M1, i.e., when no option is taken in favor of a character other than *n*, a signal appears at the output 29 of the mask M1, the equivalent of a decision on a first level of the identification circuit *n* in favor of the character *n* as a possible character. The register 17 records this result in binary, during a given period defined by the circuit 14. On the contrary, if at least one signal reaches the mask M1, there is an absence of signals at its output 29 which is tantamount to the indication by the other state of the register 17 that the image *x* is not identified as the character *n*.

The gates L of the discrimination circuits *i* and *j* of FIG. 4 are OR gates. Thus, a signal appears at the output 30 of the gate L of the circuit *i*, when at least one of the two operators P1 $(i)_n$ and P2 $(i)_n$ emits a signal. The same applies to the gate L of the circuit *j* which sends a signal to the mask M2 from its output 31, when at least one of the two operators P1 $(j)_n$ and P2 $(j)_n$ sends a signal to it. The signals stemming from the gates L are only taken into account by the mask M2 when it is validated by the output 29 of the mask M1, i.e., when no operator, such as P1 $(i)_n$, decides in favor of a character other than *n*. The mask M2 only emits a signal at the output when all of the operators P1, such as P1 $(i)_n$ and P1 $(j)_n$, opt in favor of a character $n$, or if certain of these operators are neutral, when the corresponding operators P2, such as P2 $(i)_n$ and P2 $(j)_n$, opt in favor of the character $n$. In this case, a decision on a second level is made by the identification circuit $n$ in favor of the character $n$ as an assured character and this result is recorded in register 18. The operator P1 $(i)_n$, represented in FIG. 4, is an operator, termed divisive to the extent to which the characters $n$ and $i$ have common elements allowing one to consider by the same centering, the element E1 $(n/i)$ and E1 $(i/n)$. Thus, the terminals 22 and 23 may be tied to the discrimination circuit $n$ of the identification circuit $i$, similar to the discrimination circuit $n$.

The introduction of operators, termed divisive, represents a reduction of logic circuits in the identification device according to the invention. By contrast, the operator P1 $(j)_n$, represented in FIG. 4, is an operator, termed indivisible to the extent to which the characters $n$ and $j$ have no common elements sufficient for the same centering to consider the elements E1 $(n/j)$ and E $(j/n)$. This applies for example to the characters and .

A variation of the design of the identification circuit $n$ is presented in FIG. 5. The outputs 23 and 25 of the operators P1 $(i)_n$ and P1 $(j)_n$, respectively, are linked to logic majority circuit 32 as well as the corresponding outputs of the other similar operators of the identification circuit $n$. The output 33 of this majority circuit 32 is tied to one of the inputs of the mask M1. Thus, the threshhold of the circuit 32 being defined for a given number $s$ of signals originating from operators, such as P1 $(i)_n$ and P1 $(j)_n$, the mask M1 is not validated except when the threshhold is reached, i.e., for a minimum number $s$ of discrimination circuits having opted in favor of the character $n$. The introduction of this circuit 32 then entails a stricter decision by the masks M1 and M2 than the one made by the identification circuit $n$ of FIG. 4.

A simplified design of the identification circuit $n$ and of the decision circuit 13 of FIG. 4 is presented in FIG. 6. In that illustration the register 17 is omitted so that the mask M1 makes no decision on a first level, but functions only to validate the mask M2 so that a single decision be made by the latter and recorded in the register 18. The decision circuit 13 (in FIG. 2) then, only includes the group of registers 12. As in the case of FIG. 5, the decisions made by the identification device according to FIG. 6 are stricter than those made by the device of FIG. 4.

Figure 7:
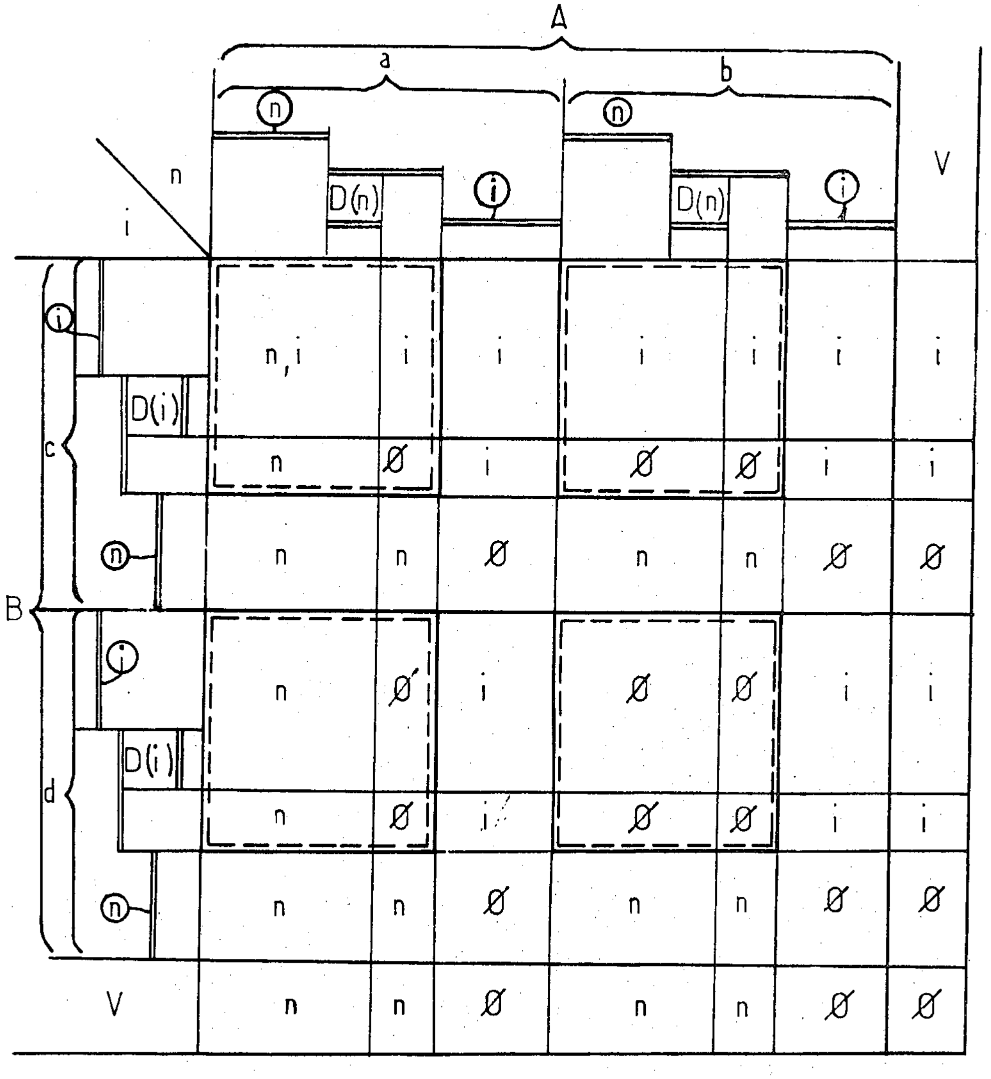
FIG. 7 is a decision table made on two levels by an identification circuit such as the one of FIG. 4.

FIG. 7 is a summary table, presented as an example, of the decisions made on two levels by the identification circuits $n$ and $i$ (without a majority logical circuit) as a function of the indications given by their discrimination circuits $i$ and $n$. The parameters listed on this table correspond with the following data:

A. Centering and validation accomplished with all operators P1 of the identification circuit $n$ other than P1 $(i)_n$ indicating $n$ as "certain" or "neutral";

B. Centering and validation accomplished with all operators P1 of the identification circuit $i$ other than P1 $(n)_i$, indicating $i$ as "certain" or "neutral";

a. for the neutral operators P1 (other than P1 $(i)_n$) with the associated operators P2 opting for the character $n$;

b. when a neutral operator P1 (other than P1 $(i)_n$) is present with the associated operator P2 not opting for the character $n$;

c. for the neutral operators P1 (other than P1 $(n)_i$) with the associated operators P2 opting for the character $i$; and d. when there is a neutral operator P1 (other than P1 $(n)_i$) with the associated operator P2 not opting for the character $i$.

$n$, neutral, $i$ — indicate the different options taken by the operators P1 $(i)_n$ and P1 $(n)_i$ D $(n)$ — corresponds with the option of P2 $(i)_n$ in favor of the character $n$, D $(i)$ — corresponds with the option of P2 $(n)_i$ (of the discrimination circuit $n$ of the identification circuit $i$) in favor of the character $i$.

V — corresponds with one of three conditions: centering or validation or operator P1 $(i)_n$ invalidated as well as for operator P1 $(n)_i$.

FIG. 7 shows particularly that the conditions A, a being carried out for the identification circuit $n$, that the conditions B, $c$ being carried out for the identification circuit $i$, — that there is a multiple decision in favor of the characters $n$ and $i$ in the following cases:

1. the operator P1 $(i)_n$ opts in favor of the character $n$, while the operator P1 $(n)_i$ opts in favor of the character $i$, or the operator P1 $(n)_i$ is neutral while the operator P2 $(n)_i$ opts in favor of the character $i$.
2. the operator P1 $(n)_i$ opts in favor of the character $i$, while the operator P1 $(i)_n$ opts in favor of the character $n$, or while the operator P1 $(i)_n$ is neutral and the operator P2 $(i)_n$ opts in favor of character $i$.
3. the operator P1 $(i)_n$ is neutral and the operator P2 $(i)_n$ opts in favor of the character $n$, while the operator P1 $(n)_i$ is neutral and the operator P2 $(n)_i$ opts in favor of the character $i$.

There is a single decision in favor of the character $i$ if the operator P1 $(n)_i$ opting in favor of the character 1; the operator P1 $(i)_n$ is neutral and the operator P2 $(i)_n$ does not opt in favor of the character $n$.

There is a single decision in favor of the character $n$, when the operator P1 $(i)_n$, opting in favor of the character $n$, the operator P1 $(n)_i$ is neutral and the operator P2 $(n)_i$ does not opt in favor of the character $i$.

There is a void decision when the operators P1 $(i)$ and P1 $(n)_i$ are neutral and the operators P2 $(i)_n$ and P2 $(n)_i$ do not opt for the characters $n$ and $i$, respectively.

The decisions enclosed in dotted frames in FIG. 7 are those made on the second level by the mask M2, called "hard level" contrary to the "soft level" which denotes the first level. This term is justified due to the fact that a decision can only be taken on the second level to the extent to which a decision on the first level is made in favor of the character with which the identification circuit is associated. It is also justified due to the fact that a decision on the second level causes the intervention of the operators P2 having the local and specific characteristics of the characters with which they are associated, in contrast to the total and loose characteristics considered by the operators P1. The registers of the system 11 of FIG. 2 for the recording of the decisions on the soft levels are called soft registers. The registers of the system 12 of FIG. 2 for the recording of the decisions on the hard levels, are called hard registers.

Thus, the decision circuit 13 of the identification device according to the invention operates in the following manner:

1) It consults all soft registers for a decision on the soft level:

| | |
|---|---|
| no register is mounted | rejection by empty decision |
| a single register mounted | unique decision in favor of the corresponding character |
| several registers are mounted | multiple decision |

2) It consults all hard registers for a decision on the hard level:

| | |
|---|---|
| no register is mounted | rejection by by empty decision |
| a single register is mounted | unique decision in favor of the corresponding character |
| several registers are mounted | rejection by multiple decision |

Figure 8:
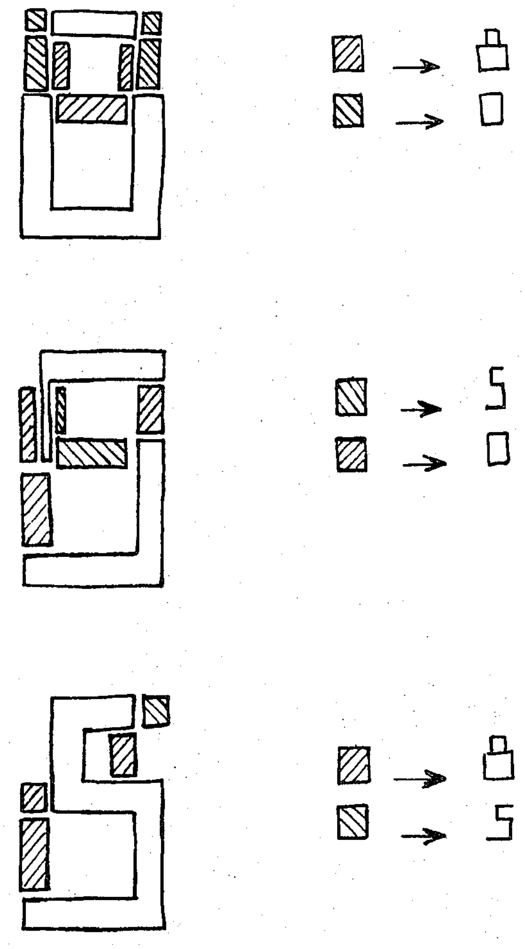
FIG. 8 represents characters and their specific elements, taken into consideration by the operators of certain discrimination circuits of the device of the invention.

FIG. 8 presents for exemplary purposes the common elements represented by the white parts) and the specific elements (represented by the cross-hatched parts), defined statistically, respectively for the characters □ and □, 5 and □, □ and 5, to produce the operators P1 the equivalents of the operators P1 $(i)_n$ and P1 $(j)_n$ of FIGS. 4, 5 and 6. One will notice that the specific elements when considered vary in number from character to character, in extension and in position in the bars of which they are part. The choice of these elements is basically made in such a way as to select the most characteristic printed zones of a character located between two common zones with another character.

Figure 9:
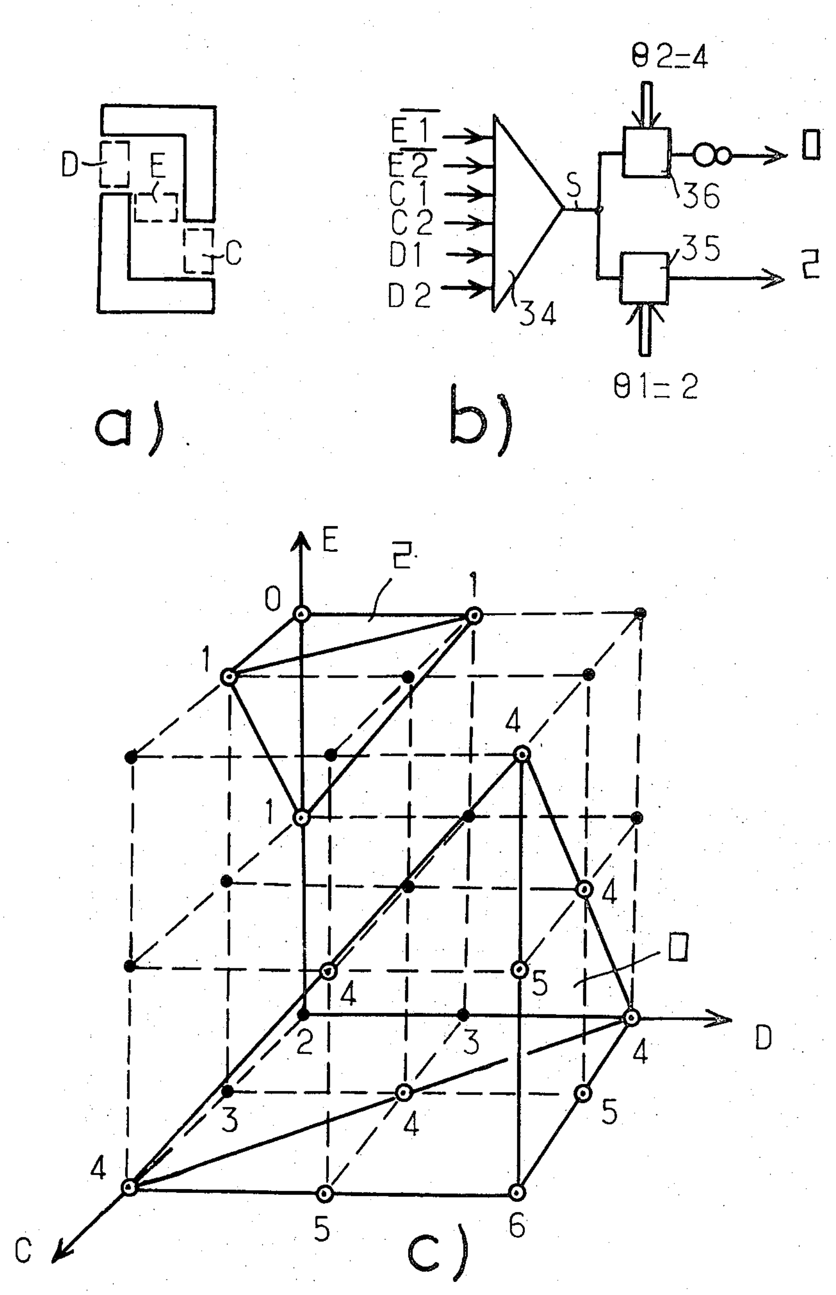
FIG. 9 shows an example of an operator having an effect on the specific elements of two model characters, and geometrical representation of the responses which it gives as a function of the elements present in the image of the character to be identified.

The zones surrounded by plain strokes in FIG. 9a are elements common to the characters 2 and □, while the zones bordered by dashes are the specific elements of these characters. The zone E is a specific element of character 5 and the zones C and D are specific elements of character □. The operator P1 ( 2 ) □, equivalent to the operator P1 $(i)_n$ of FIGS. 4, 5 and 6, is connected with a group of positions of the character memory 10 so that it can see the elements C, D and E when the analyzed image $x$ is framed in the memory. A detector element, not shown here, consisting of operational amplifiers, for example, evaluates the elements present in the image $x$, to be attributed, partially, to the specific element E and, partially, to the specific elements C and D, and indicates by a binary code the absence, or the partial or total presence, of each of the three elements C, D and E. This code may, for example, be the following:

| elements | | totally present | partially present | absent |
|---|---|---|---|---|
| E | E1 | 1 | 1 | 0 |
| | E2 | 1 | 0 | 0 |
| C | C1 | 1 | 1 | 0 |
| | C2 | 1 | 0 | 0 |
| D | D1 | 1 | 1 | 0 |
| | D2 | 1 | 0 | 0 |

The evaluation of the predominant elements of image $x$ (to be attributed to the specific elements E, C and D) makes it possible to opt in favor of one of the two characters 2 and □ and is effected as, for example, in FIG. 9b. The comparison of the components E1 and E2 is carried out by their logic subtraction in the circuit 34, i.e., by the adding of C1, C2, D1, D2 and the reverse componants $\overline{E1}$, $\overline{E2}$. In the case of the above chosen code, the comparison of the result S of said addition on two adjustable threshholds $\theta 1 = 2$ and $\theta 2 = 4$, in two differential amplifiers 35 and 36, for example, provides the indication of an option in favor of the character 5 if $S<2$ and in favor of the character □ if $S \geqq 4$ after reversal of the signal in the output of the amplifier 36. FIG. 9c shows a geometrical representation in 3-dimensional space, of the options taken by the operator P1 ( 2 ) □ as a function of the variables (E1, E2), (C1, C2), (D1, D2) and S, specific for the image $x$. Thus, the value $S = 0$ corresponds with the values: $E1 = 1$, $C1 = 0$, $C2 = 0$, $D1 = 0$, $D2 = 0$, i.e., according to the chosen code, with the completely present element E and with the elements C and D absent in the image $x$. The value $S = 1$, resulting from the values: $E1 = 1$, $E2 = 1$ with C1 or $D1 = 1$ and $C1 = 0$ corresponds with the complete presence of the element E and the partial presence of one of the two elements C and D. The value $S = 1$, resulting from the values: $E1 = 1$, $E2 = 0$ with $C1 = C2 = D1 = D2 = 0$ corresponds with the partial presence only of the element E. An option in favor of the character 2 is well justified in these three cases. In the same manner, one may observe in FIG. 9c that an option in favor of the character □ is taken in the following cases:

1. the elements C and D are fully present, while the element E is absent ($S = 6$), or partially present ($S = 5$) or totally present ($S = 4$);
2. one of the elements C and D is fully present, whereas the other is partially present, while the element E is absent ($S = 5$), or partially present ($S = 4$);
3. one of the elements C and D is fully present, whereas the other is absent, while the element E is absent ($S = 4$).

Figure 10:
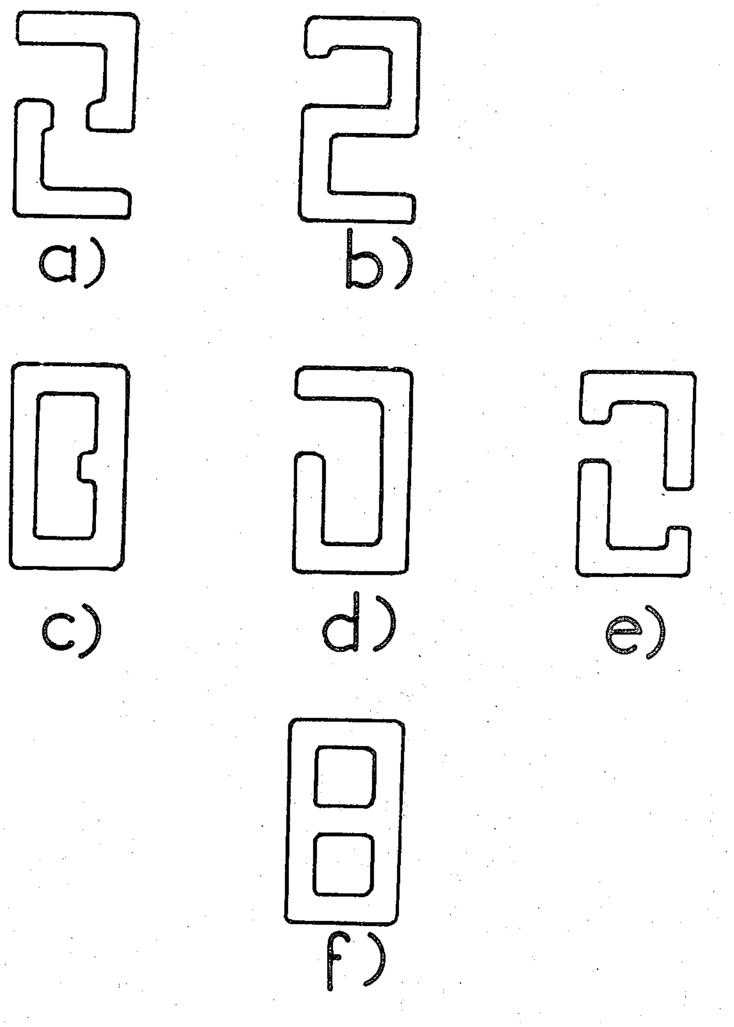
FIG. 10 depicts some examples of deformed characters recognized by the operator of FIG. 9.

FIG. 10 offers examples for which the operator P1 ( 2 ) □ is capable of contributing to the identification of the deformed characters. Thus, the characters of FIGS. 10a and 10b are recognized as 2, the characters of FIGS. 10c, 10d and 10e are recognized as □, in the same way as the character of FIG. 10f (by the predominance of the totally present elements C and D).

Figure 11:
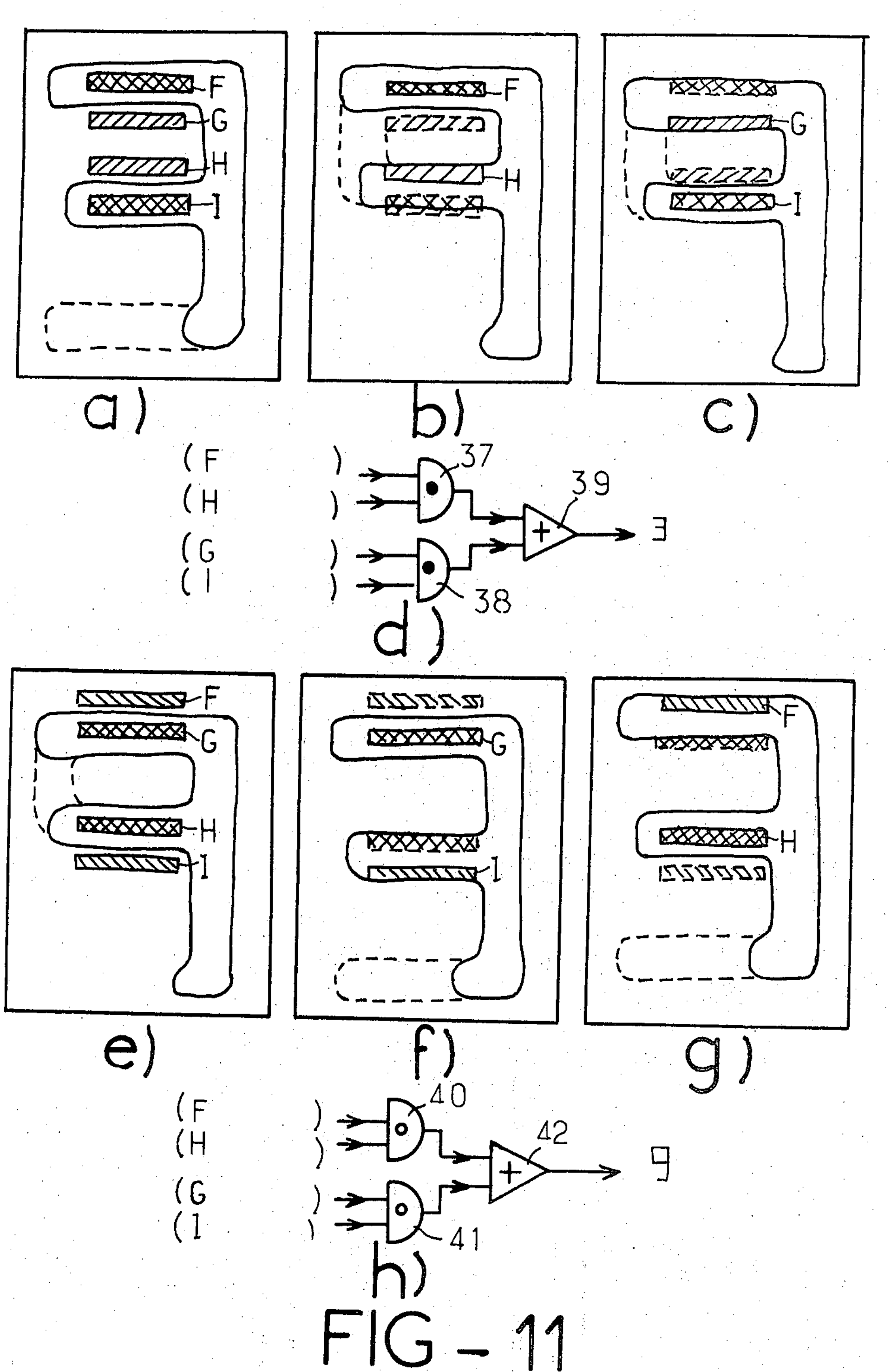
FIG. 11 shows two examples of operators and the specific elements of two characters, one in relation to the other which these operators influence.

The circuits of FIGS. 11d and 11h are operators P2 ( 9 ) 3 and P2 ( 3 ) 9 similar to the operators P2 $(i)_n$ and P2 $(j)_n$ of FIGS. 4, 5 and 6. The cross-hatched zones F, G, H and I of the FIGS. 11a, 11b, 11c, 11d, 11e, 11f and 11g, represent groups or marker positions of the character memory 10 by relation to which the horizontal bars of the image $x$ (if they exist) may be framed when each of these zones occupies the center of a bar. This is true of the zones F and I placed respectively in the center of the two horizontal bars of the image of the character of FIG. 11a. In FIG. 11b the zone F is centered, while the zone I is centered in the FIG. 11c. In FIG. 11e the zones G and H are centered, while in the FIGS. 11f and 11g it is the zones G and H which are centered, respectively. The specific elements defining the operators P2 ( 9 ) 3 and P2 ( 3 ) 9 of the FIGS. 11*d* and 11*h* are the intervals of the horizontal bars determined by the relative positions determined by the zones F, G, H and I, among each other.

Thus, for the operator P2 (ꟼ)ヨ, the image of a character is recognized as a ヨ if the zones F, G, H, I do not occupy relative positions corresponding with the horizontal bars of a ꟼ: the zone F centered in the upper bar with the zone H in the interior of the lower bar (as in FIG. 11*b*), or the zone I centered in the lower bar with the zone G inside the upper bar. The operator P2 (ヨ)ꟼ of the FIG. 11*d* is then defined by the following conditions:

— zone F framed with zone H outside the lower bar (H white) or

— zone I framed with zone G outside the upper bar (G white), the detectors permitting the analysis of the location of the different zones in relation to said bars are effected by known means. The AND gate 37 of FIG. 11*d*, tied to two of these detectors, emits a signal at its output when the conditions (F hidden) and (H white) are accomplished. In the same manner, the AND gate 38, tied to two other detectors, emits a signal at its output when the conditions (I framed) and (G white) are achieved. The OR gate 39, receiving at least one signal from these gates 37 and 38, indicates at its output an option in favor of the character ヨ of the discrimination circuit ꟼ contained in the identification circuit ヨ. This applies to the image of a character, such as represented in FIG. 11*a*. In the same manner, the operator P2 (ヨ)ꟼ recognizes the image of a character as ꟼ if the zones F, G, H and I do not occupy relative positions corresponding with the horizontal bars of an ヨ: zone G centered in the upper bar with zone I inside the lower bar (as in FIG. 11*f*), or zone H centered in the lower bar with zone F inside the upper bar (as in FIG. 11*g*). The operator P2 (ヨ)ꟼ comprises two AND gates 40 and 41 emitting a signal at their output when the following conditions are met: zone H framed with zone F outside the upper bar (F white) and zone G framed with the zone I outside the lower bar (I white). The OR gate 42 receiving at least one signal from these gates 40 and 41 indicates at its output an option in favor of the character ꟼ of the discrimination circuit ヨ contained in the identification circuit ꟼ.

Figure 12:
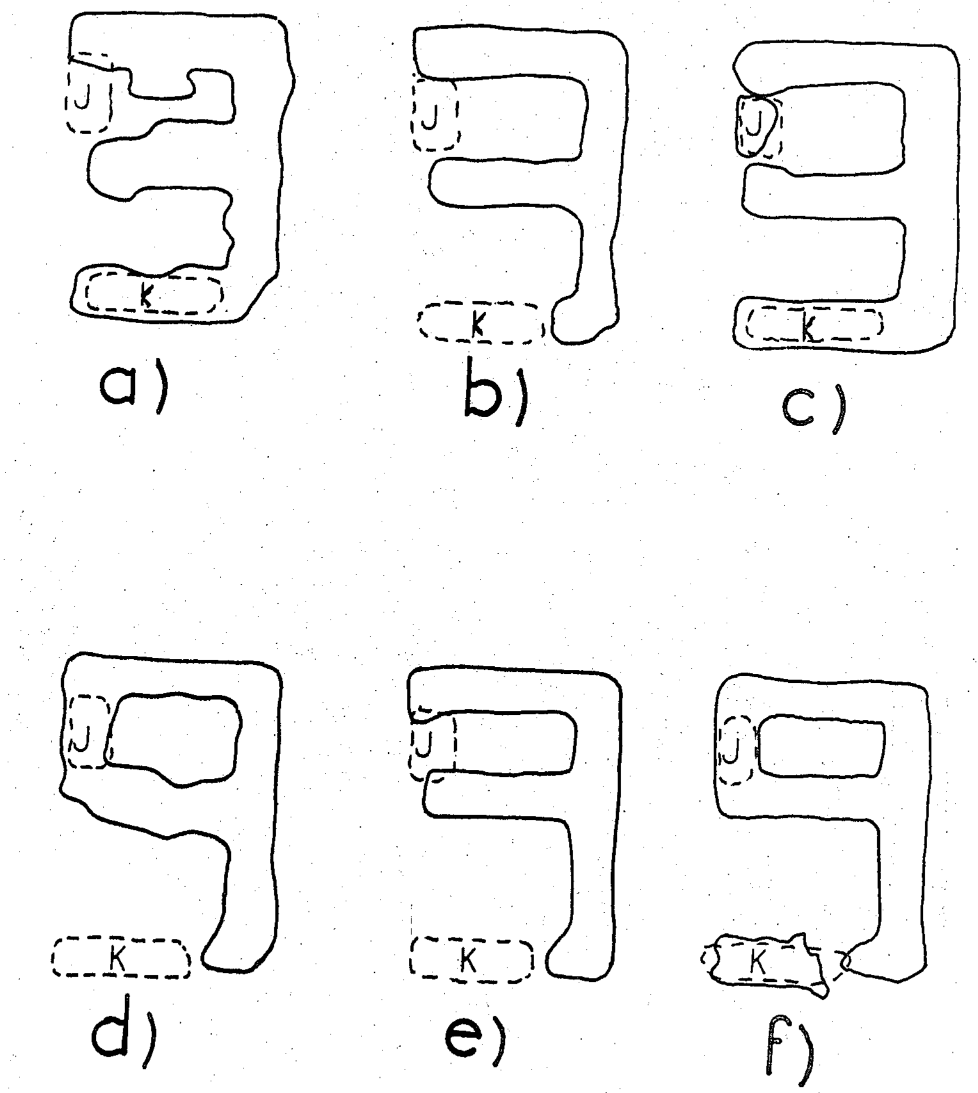
FIG. 12 presents some examples of deformed characters recognized by the operator of FIG. 11.

FIGS. 12*a*, 12*b* and 12*c* present three examples of character images which a discrimination circuit ꟼ (contained in the identification circuit ヨ of a device according to the invention) is capable of recognizing by its operators P1 (ꟼ)ヨ and P2 (ヨ)ꟼ, similar to those of FIGS. 9*b* and 11*d*, respectively. Thus, for the image of the character of FIG. 12*a* a decision in favor of the character ヨ has been made by the operator P1 (ꟼ)ヨ affecting the elements J and K. In the case of FIGS. 12*b* and 12*c* the operator P1 (ꟼ)ヨ faces an ambiguity and it is the operator P2 (ꟼ)ヨ which makes the decision in favor of the character ヨ by evaluation of the distance between the horizontal bars as the operator of the FIG. 11*d*. FIGS. 12*d*, 12*e* and 12*f* give three other examples of character images which a discrimination circuit ヨ (contained in the identification circuit ꟼ of a device according to the invention) is capable of recognizing by its operators P1 (ヨ)ꟼ and P2 (ヨ)ꟼ, similar to those of FIGS. 9*b* and 11*h*, respectively. Thus, the operator P1 (ヨ)ꟼ makes a decision in favor of the character ꟼ in the case of FIG. 12*d* by considering the same elements J and K as the operator P1 (ꟼ)ヨ. The images of the characters of the FIGS. 12*e* and 12*f* cause an ambiguity for the operator P1 (ヨ)ꟼ. In this case it is the operator P2 (ヨ)ꟼ as that of FIG. 11*h* which makes a decision in favor of the character ꟼ by evaluation of the interval between the horizontal bars of these two images.

The operators of FIGS. 11*d* and 11*h*, such as they were described, affect the specific elements of the characters each including two horizontal bars whose deviation is different as the pair of characters ヨ and ꟼ.

In the case of a pair of characters, such as ヨ and □, the specific elements of the characters ヨ and □, making it possible to produce the operators P2 (ヨ)□ and P2 (□)ヨ, are, for example, the beginnings of bars, such as the localized zones 43 and 44 representing them in FIGS. 13*b*, 13*c*, 13*e*, 13*f*, 13*g*, 13*h* and 13*i*. These figures, as well as FIG. 13*a* and 13*d* illustrate, as in FIG. 12, in which cases, and when, the operators P2 intervene with the operators P1 (of the same discrimination circuits) for decisions on the "soft" and "hard" level.

Figure 13:
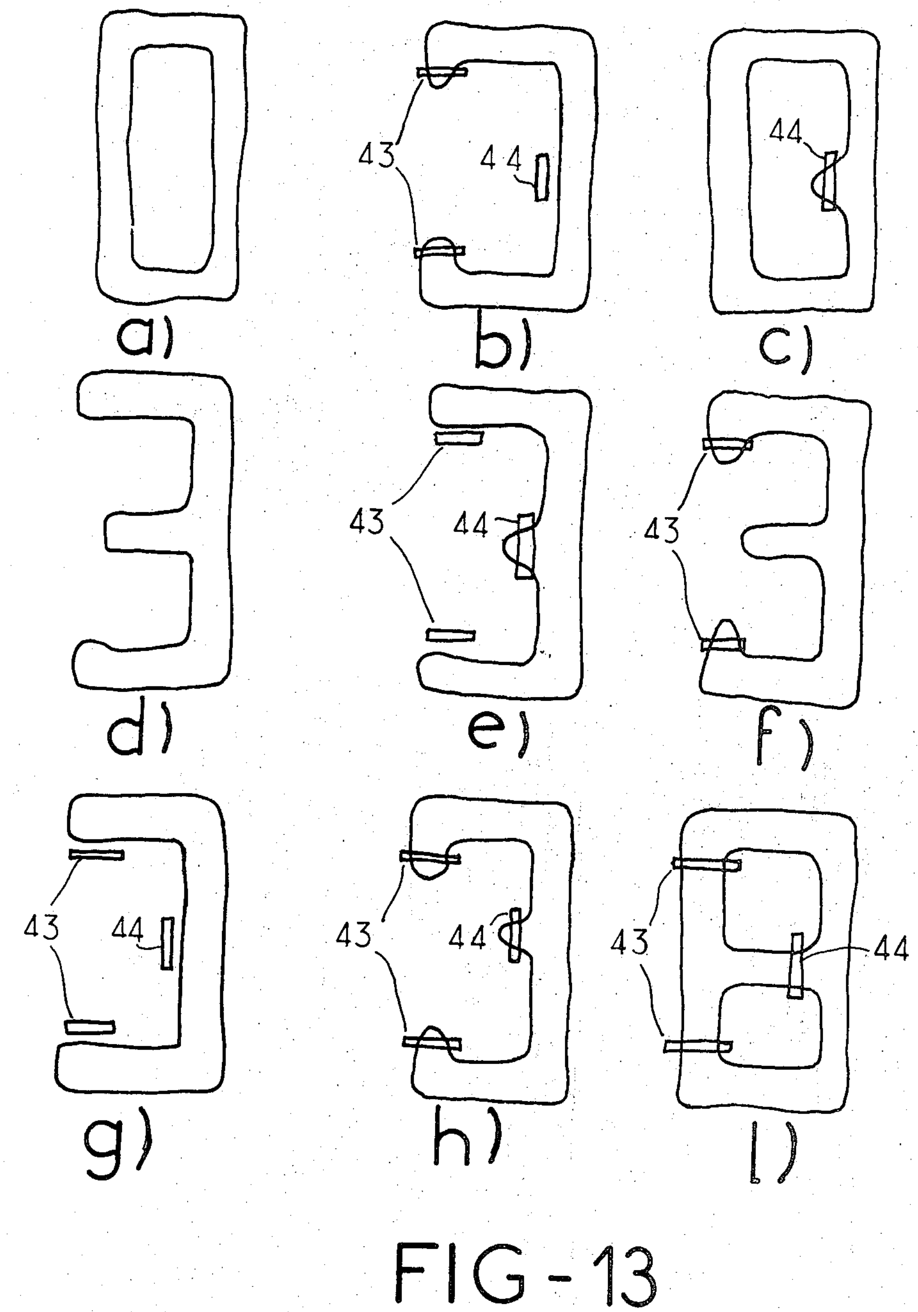
FIG. 13 presents some examples of deformed characters recognized by the different operators of the device according to the invention.

In the case of FIG. 13*a*, a single decision is made on the "soft" level for the recognition of the character □ by option of the operator P1 (ヨ)□ of the identification circuit □, in favor of □. In the case of FIG. 13*b*, a multiple decision is first made on the "soft" level by the operators P1 (□)ヨ and P1 (ヨ)□ of the identification circuits ヨ and □ which remain neutral. The operator P2 (□)ヨ, belonging to the discrimination circuit □ of identification circuit ヨ, then intervenes with the specific elements 43 for a rejection of the character ヨ on a "hard" level by the identification circuit ヨ. By contrast, the operator P2 (ヨ)□, belonging to the discrimination circuit ヨ of the identification □, intervenes with the specific elements 44 for a single decision on the hard level in favor of the character □ by the identification circuit □. The character of FIG. 13*c* is recognized as □ on a "soft" level of decision by intervention of the operator P1 (ヨ)□ of the identification circuit □, without the operator P2 (ヨ)□ being consulted. In the same manner, the character of FIG. 13*d* is recognized as ヨ on a "soft" level of decision of the identification circuit ヨ, without the operator P2 (□)ヨ being consulted.

The character of the FIG. 13*e* causes an ambiguity for the operators P1 (□)ヨ and P1 (ヨ)□ of the identification circuits ヨ and □. The consultation of the operators P2 (□)ヨ and P2 (ヨ)□ produces a "hard" decision in favor of ヨ by the identification circuit ヨ and a rejection on a "hard" level by identification circuit □. The operator P1 (□)ヨ intervenes for a decision on a "soft" level in favor of ヨ, as far as the character of FIG. 13*f* is concerned, without consultation of the operator P2 (□)ヨ.

The characters of FIGS. 13*g* and 13*h* cause ambiguities for the operators P1 (□)ヨ and P1 (ヨ)□. In the case of FIG. 13*g* the operators P2 (□)ヨ and P2 (ヨ)□ intervene for a decision on a "hard" level in favor of the characters ヨ and □ by the identification circuits ヨ and □. A multiple decision on the "hard" level is then taken by the identification device according to the invention. By contrast, in the case of FIG. 13*h*, the same operators P2 (□)ヨ and P2 (ヨ)□ intervene for a rejection on a "hard" level of the characters ヨ and □ by the identification circuits ヨ and □. A void decision on a "hard" level is then made by the identification device. The character of FIG. 13l is completely identical with that of FIG. 10f. It is, therefore, accepted as □, especially by the operators P1 ( ƨ )□ and P1 ( Ɛ )□ without the intervention of the operators P2, as, for example, the operators P2 ( ƨ )□ and P2 ( Ɛ )□.

The characters of FIGS. 13c and 13f show the interest in first providing an intervention of the operators P1, such as P1 (□)Ɛ and P1 ( Ɛ )□, affecting the specific elements which may be decisive in a decision of the identification device, without local defects being considered by error. The choice of specific elements, compared in a comparator P1, is also important since it makes it possible to eliminate ambiguities as in FIG. 13b which are not removed by known identification devices. The characters of FIGS. 13b and 13e demonstrate the reason for the use of local scanning of a character to be recognized by operators P2, as for example P2 (□)Ɛ and P2 ( Ɛ )□. Such scanning permits, in fact, the detection of sufficient beginnings of specific elements so as not to reject a character by error. The characters of FIGS. 13g and 13h also provide clear evidence for the concern in an identification device according to the invention, which does not make rejects except on a "hard" level, fully determined by the specific elements taken into account, such as the elements 43 and 44 of FIG. 13b. Due to this fact, the precision with which said device operates can be very high, limited essentially by the process of character printing.

The preceding description presents the essential characteristics of the applied invention, but it is not limited to a mode of embodiment of a character-identification device, even of deformed characters, of the type OCRA. Especially to be noted is the full importance of the operators which were described and whose characteristics enable a system of character recognition to accomplish superior performances from the viewpoint of the rate of rejection and the percentage of errors in the identification of characters.

What is claimed is:

1. A character-identification device for N model characters comprising N identification circuits operating with masks, a circuit of validation and of complete centering, and a decision circuit, characterized in that:

a. the identification device receives from a character memory an image x of a character to be recognized;
b. each identification circuit is associated with a given character pattern for the identification of the image x with this character, and includes a mask circuit and at the most (N–1) discrimination circuits;
c. a character n is any one of the N model characters and a character i is any one of the (N–1) characters other than n;
d. the character n is characterized statistically by the elements E1(n/i) which are specific to it in relation to the character i and render it totally different from the character i;
e. the character i is characterized statistically by the elements common with character n, by the elements E1(i/n) which are specific to it in relation to the character n and by the specific elements E2 (i/n) each depending on a specific element and a common element which differentiate it locally from the character n; a circuit of identification n includes a mask circuit and a discrimination circuit i, wherein the different circuits are defined in the following manner:

— said mask circuit includes a first mask M1, validated by the validation circuit, permitting a first level of decision and the validation of a second mask M2 for a second level of decision;
— the discrimination circuit i includes a first operator P1(i)n, associated, partially with the elements E1(n/i) and, partially, with the elements E1(i/n), a second operator P2(i)n, assocaited with the elements E2(i/n), and a gate L whose two inputs are tied to a first output of the operator P1(i)n and to the output of the operator P2(i)n, respectively, the second output of operator P1(i)n being linked with said mask circuit as well as the output of the gate L, the operator P1(i)n serving to evaluate if the elements of the image x, to be attributed, on the one hand, to the elements E1(n/i), and, on the other hand, to the elements E(i/n) make it possible, by comparison to opt between the characters n and i, or to indicate an ambiguity, and in the case where the operator P1(i)n does not opt for the character i, the operator P2(i)n to indicate if the elements E2(i/n) are not elements of the image x so that a decision at least on one level may be made in an assured manner in favor of character n in relation to character i;
— all discrimination circuits, conceived in a similar fashion as the discrimination circuit i, are connected in parallel with said mask circuit to contribute to a decision at least on one level by the identification circuit n;
— all identification circuits, conceived in a similar manner as the identification circuit n, are connected by their mask circuits similar to said mask circuit with a group of registers contained in the decision circuit, so that each decision made by an identification circuit is stored in one of said registers, the periodical consultation of these registers enabling the decision circuit, controlled by the validation circuit, to indicate the recognized character.

2. A character-identification device according to claim 1, characterized in that the first output of the operator P1(i)n indicates an option in favor of the character n and its second output indicates an option in favor of character i, the mask M1 is an AND gate comprising, outside of the input of the validation linked to said validation circuit, a number of inputs equal to the number of discrimination circuits contained in the identification circuit n, each of these inputs being tied to a second output of one of the operators similar to the operator P1(i)n by an inverter.

3. A character-identification device according to claim 2, characterized in that the gate L is an OR gate and in that the mask M2 is an AND gate comprising, outside of the validation input connected with said validation circuit, a number of inputs equal to the number of the discrimination circuits contained in the identification circuit n, each of these inputs being tied to the output of the OR gate of one of the discrimination circuits.

4. A character-identification device according to claim 1, characterized in that the identification circuit $n$ is connected by the output of the mask M2 to a first register of the system of registers contained in the decision circuit for the storage of a second decision-level of the identification circuit $n$.

5. A character-identification device according to claim 4, characterized in that the identification circuit is linked, moreover, by the output of the mask M1 to a second register of the system of registers contained in the decision circuit for storage of a first-decision level of the identification circuit $n$.

6. A character-identification device according to claim 1, characterized in that the mask circuit comprises, furthermore, a logical-majority circuit having a number of inputs equal to the number of discrimination circuits contained in the identification circuit $n$, each of these inputs being linked to an additional input of the mask M1, so that the mask M1 is validated only for a given minimum number of options in favor of the character $n$ of the discrimination circuits contained in the identification circuit $n$.

7. A character-identification device according to claim 5, characterized in that the decision circuit, by consulting first the system of registers similar to said second register, indicates either a single decision in favor of one of N model characters, or declares a rejection in the absence of a decision, and, in the case where a multiple decision is made in favor or several of the N model characters, in that, by then consulting the system of registers similar to said first register, indicates either a single decision in favor of one of the N model characters, or declares a rejection in the absence of a decision or by a multiple decision in favor of several of the N model characters.

8. A character-identification device according to claim 1, characterized in that the operator $P1(i)n$ includes a detector of the elements contained in the image $x$, to be attributed to the elements $E1(n/i)$ and $E1(i/n)$, respectively, indicating by a binary code the absence or the partial presence or total presence of the elements $E1(n/i)$ and $E1(i/n)$, a circuit taking into account the different detected elements in coded form whose output is linked with two differential amplifiers with adjustable threshold, making it possible to indicate an option in favor of the characters $n$ and $i$, respectively or an ambiguity.

9. A character-identification device according to claim 8, characterized by the detector contained in the operator $P1(i)n$ indicating the absence or the partial or total presence of bars.

10. A character-identification device according to claim 1, characterized in that the operator $P2(i)n$ includes a detector of elements contained in the image $x$, to be attributed to the elements $E2(i/n)$ indicating the absence, or the partial or total presence of the elements ($E2(i/n)$ and a differential amplifier with adjustable threshold to indicate an option in favor of the character $n$.

11. A character-identification device according to claim 10, characterized by the detector contained in the operator $P2(i)n$ indicating the absence or partial or total presence of the beginnings of bars.

12. A character-identification device according to claim 1, characterized in that, a first bar is a common element of the characters $n$ and $i$, and a second bar, parallel to the first, is an element specific of the character $i$, the operator $P2(i)n$ indicating that the image $x$ of the character to be recognized, including the first bar, does not represent another parallel bar coinciding with the second bar, so that the image $x$ may be identified as character $n$.

13. A character-identification device according to claim 12, characterized in that, four parallel marker zones of the character memory is connected with the operator $P2(i)n$, a first and a second zone being able to occupy the center of the first and the second bar, respectively, of the image of the character $i$, while a third and a fourth zone are positioned inside the second and the first bar, respectively, the operator $P2(i)n$ including means for framing of a first and a second bar of the image $x$ so that the first and the second zone occupy respectively the center of the bars of the image $x$, and a detector of the framing of the bars of the image $x$ also indicating if the third and the fourth zones are outside the second and the first bar, respectively, of the image $x$.

14. A character-identification device according to claim 13, characterized by the operator $P2(i)n$ including, moreover, two AND gates with two inputs connected with the detector and an OR gate indicating at its output an option of the operator $P2(i)n$ in favor of the character $n$.

* * * * *